US011406939B2

(12) United States Patent
Collier et al.

(10) Patent No.: US 11,406,939 B2
(45) Date of Patent: Aug. 9, 2022

(54) PASSIVE NOX ADSORBER

(71) Applicant: JOHNSON MATTHEY PUBLIC LIMITED COMPANY, London (GB)

(72) Inventors: Jillian Collier, Reading (GB); David Thompsett, Reading (GB); Alessandro Turrina, Reading (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/367,310

(22) Filed: Mar. 28, 2019

(65) Prior Publication Data
US 2019/0299161 A1    Oct. 3, 2019

(30) Foreign Application Priority Data
Mar. 28, 2018    (GB) ...................... 1805084

(51) Int. Cl.
*B01J 29/80* (2006.01)
*B01D 53/94* (2006.01)
*B01J 29/74* (2006.01)
*B01J 35/00* (2006.01)
*B01J 35/04* (2006.01)
*B01J 37/02* (2006.01)
*B01J 37/10* (2006.01)
*F01N 3/08* (2006.01)
*F01N 3/10* (2006.01)
*B01J 23/44* (2006.01)
*B01J 29/70* (2006.01)
*F01N 3/033* (2006.01)
*F01N 3/20* (2006.01)

(52) U.S. Cl.
CPC ....... *B01D 53/9481* (2013.01); *B01D 53/944* (2013.01); *B01D 53/9422* (2013.01); *B01D 53/9468* (2013.01); *B01D 53/9472* (2013.01); *B01J 23/44* (2013.01); *B01J 29/70* (2013.01); *B01J 29/74* (2013.01); *B01J 35/0006* (2013.01); *B01J 35/04* (2013.01); *B01J 37/0201* (2013.01); *B01J 37/0236* (2013.01); *B01J 37/10* (2013.01); *F01N 3/0814* (2013.01); *F01N 3/0842* (2013.01); *F01N 3/103* (2013.01); *B01D 2255/1023* (2013.01); *B01D 2255/50* (2013.01); *B01D 2255/9022* (2013.01); *B01D 2255/9032* (2013.01); *B01D 2255/9035* (2013.01); *B01D 2255/91* (2013.01); *B01D 2255/9155* (2013.01); *B01D 2258/012* (2013.01); *F01N 3/033* (2013.01); *F01N 3/0821* (2013.01); *F01N 3/2066* (2013.01); *F01N 2510/0682* (2013.01); *F01N 2510/0684* (2013.01); *F01N 2570/14* (2013.01); *F01N 2570/145* (2013.01)

(58) Field of Classification Search
CPC ... B01J 20/18; B01J 23/44; B01J 35/04; B01J 35/0006; B01J 37/0236; B01J 37/0201; B01J 37/10; B01J 37/30; B01J 29/70; B01J 29/061; B01J 29/068; B01J 29/74; B01J 29/80; B01J 29/83; B01J 29/85; B01J 2029/062; F01N 3/0842; F01N 3/103; F01N 3/0814; F01N 3/033; F01N 3/2066; F01N 3/0821; F01N 2570/14; F01N 2570/145; F01N 2510/0682; F01N 2510/0684; Y02A 50/20; Y02C 20/10; B01D 53/9481; B01D 53/9472; B01D 53/944; B01D 53/9422; B01D 53/9468; B01D 2258/012; B01D 2255/91; B01D 2255/50; B01D 2255/1023; B01D 2255/9032; B01D 2255/9155; B01D 2255/9022; B01D 2255/9035; B01D 53/9418
USPC .... 502/60, 63, 64, 66, 67, 69, 74, 400, 406, 502/415, 407; 422/177, 180; 423/235, 423/239.1, 239.2
See application file for complete search history.

(56) References Cited

U.S. PATENT DOCUMENTS

| | | | |
|---|---|---|---|
| 4,300,956 A | 11/1981 | Rosenberger | |
| 5,146,743 A | 9/1992 | Maus | |
| 6,513,324 B2 | 2/2003 | Bruck | |
| 2007/0187293 A1 | 8/2007 | Cherrillo et al. | |
| 2007/0286782 A1 | 12/2007 | Zones | |
| 2008/0056970 A1* | 3/2008 | Zones | B01J 29/70 423/213.2 |
| 2008/0058196 A1 | 3/2008 | Zones | |
| 2012/0110988 A1* | 5/2012 | Dotzel | C04B 38/0006 60/299 |
| 2015/0157982 A1 | 6/2015 | Rajaram et al. | |
| 2015/0158019 A1 | 6/2015 | Rajaram | |
| 2016/0136626 A1 | 5/2016 | Phillips | |
| 2016/0250594 A1 | 9/2016 | Casci | |
| 2016/0367938 A1* | 12/2016 | Larsson | B01J 23/8472 |

(Continued)

FOREIGN PATENT DOCUMENTS

| | | |
|---|---|---|
| JP | H06182219 A | 7/1994 |
| JP | 2021-516153 A | 7/2021 |

(Continued)

OTHER PUBLICATIONS

Russell et al., Diesel Oxidation Catalysts, Catalysts Reviews: Science and Engineering 2011, 53(4), 337-423 (D2).

*Primary Examiner* — Elizabeth D Wood

(57) ABSTRACT

A NOx adsorber catalyst for treating an exhaust gas from a diesel engine. The NOx adsorber catalyst comprises a first region comprising a NOx adsorber material comprising a first molecular sieve catalyst. The first molecular sieve catalyst comprises a first noble metal and a first molecular sieve, and the first molecular sieve contains the noble metal. The first molecular sieve has an STI Framework Type.

19 Claims, 3 Drawing Sheets

(56) References Cited

U.S. PATENT DOCUMENTS

| | | |
|---|---|---|
| 2017/0001169 A1 | 1/2017 | Collier |
| 2017/0095805 A1 | 4/2017 | Chiffey et al. |
| 2017/0096922 A1 | 4/2017 | Bergeal et al. |
| 2018/0056278 A1 | 3/2018 | Feaviour |
| 2018/0058293 A1* | 3/2018 | Marsh .................. F01N 13/009 |
| 2018/0304244 A1* | 10/2018 | Bidal ................. B01J 20/28045 |

FOREIGN PATENT DOCUMENTS

| | | |
|---|---|---|
| KR | 10-2009-0021376 A | 4/2014 |
| KR | 10-2017-0083631 A | 7/2017 |
| WO | 2007146622 A1 | 12/2007 |
| WO | 2007146622 A2 | 12/2007 |
| WO | 20080047170 | 4/2008 |
| WO | 2012026045 A1 | 3/2012 |
| WO | 2012114187 A2 | 8/2012 |
| WO | 2012166868 A1 | 12/2012 |
| WO | 2015033798 A1 | 3/2015 |
| WO | 2015085305 A1 | 6/2015 |
| WO | 2016079507 A1 | 5/2016 |
| WO | 2019042883 A1 | 3/2019 |

\* cited by examiner

PASSIVE NOX ADSORBER

FIELD OF THE INVENTION

The invention relates to a passive NOx adsorber for a lean burn engine and to an exhaust system for a lean burn engine comprising the $NO_x$ adsorber catalyst. The invention also relates to a method of using the passive NOx adsorber to treat an exhaust gas from a lean burn engine.

BACKGROUND OF THE INVENTION

Lean burn engines, such as diesel engines, produce an exhaust emission that generally contains at least four classes of pollutant that are legislated against by inter-governmental organisations throughout the world: carbon monoxide (CO), unburned hydrocarbons (HCs), oxides of nitrogen ($NO_x$) and particulate matter (PM).

A variety of emissions control devices exist for the treatment of oxides of nitrogen ($NO_x$). These devices include, for example, a selective catalytic reduction (SCR) catalyst, a selective catalytic reduction filter (SCRF™) catalyst, a lean $NO_x$ catalyst [e.g. hydrocarbon (HC) SCR catalyst], a lean $NO_x$ trap (LNT) [also known as a $NO_x$ storage catalyst (NSC) or a $NO_x$ adsorber catalyst (NAC)] and a passive NOx adsorber (PNA).

SCR catalysts or SCRF™ catalysts typically achieve high efficiencies for treating $NO_x$ by reduction once they have reached their effective operating temperature. However, these catalysts or devices can be relatively inefficient below their effective operating temperature, such as when the engine has been started from cold (the "cold start" period) or has been idling for a prolonged period.

Another common type of emissions control device for reducing or preventing the emission of $NO_x$ is a lean $NO_x$ trap (LNT). During normal operation, a lean burn engine produces an exhaust emission having a "lean" composition. An LNT is able to store or trap the nitrogen oxides ($NO_x$) that are present in the "lean" exhaust emission. The LNT stores or traps the $NO_x$ present in the exhaust emission by a chemical reaction between the $NO_x$ and a $NO_x$ storage component of the LNT to form an inorganic nitrate. The amount of $NO_x$ that can be stored by the LNT is limited by the amount of $NO_x$ storage component that is present. Eventually, it will be necessary to release the stored $NO_x$ from the $NO_x$ storage component of the LNT, ideally when a downstream SCR or SCRF™ catalyst has reached its effective operating temperature. Release of stored $NO_x$ from an LNT is typically achieved by running the lean burn engine under rich conditions to produce an exhaust emission having a "rich" composition. Under these conditions, the inorganic nitrates of the $NO_x$ storage component decompose to reform $NO_x$ a portion of which is then converted to $N_2$ under the rich conditions This requirement to purge an LNT under rich conditions is a disadvantage of this type of emissions control device because it affects the fuel economy of the vehicle and it increases the amount of carbon dioxide ($CO_2$) by combustion of additional fuel. LNTs also tend to show poor $NO_x$ storage efficiency at low temperatures.

A relatively new type of emissions control device for $NO_x$ is a passive $NO_x$ adsorber (PNA). PNAs are able to store or adsorb $NO_x$ at relatively low exhaust gas temperatures (e.g. less than 200° C.), and release $NO_x$ at higher temperatures. The $NO_x$ storage and release mechanism of PNAs is thermally controlled, unlike that of LNTs which require a rich purge to release stored $NO_x$.

Co-pending U.S. Pat. Pub. No. 2016/0250594 discloses a passive NOx adsorber (PNA) that comprises a noble metal and a small pore molecular sieve such as chabazite (CHA). Although noble metal/zeolite PNA catalysts such as Pd/CHA and Pd/Beta show good NOx storage performance and improved sulfur tolerance compared to non-zeolite PNAs, the temperature at which the NOx is released is too low for the downstream SCR component to convert all of the NOx to $N_2$.

As with any automotive system and process, it is desirable to attain still further improvements in exhaust gas treatment systems, particularly under cold start conditions.

We have discovered a new passive NOx adsorber that provides enhanced cleaning of the exhaust gases from internal combustion engines. The new passive NOx adsorber increases the NOx release temperature, which has the benefit of improving overall NOx reduction by improving the overlap with downstream catalysts that catalytically reduce NOx, e.g. a downstream SCR or SCRF™ catalyst.

SUMMARY OF THE INVENTION

In a first aspect of the invention there is provided a NOx adsorber catalyst for treating an exhaust gas from a diesel engine comprising:

a first region comprising a NOx adsorber material comprising a first molecular sieve catalyst, wherein the first molecular sieve catalyst comprises a first noble metal and a first molecular sieve, and wherein the first molecular sieve contains the noble metal;

wherein the first molecular sieve has an STI Framework Type.

In a second aspect, the invention further provides an exhaust system for a lean burn engine, such as a diesel engine. The exhaust system comprises a NOx adsorber catalyst of the invention and an emissions control device.

In a third aspect, the invention provides a vehicle comprising a lean burn engine and either the $NO_x$ adsorber catalyst or the exhaust system of the invention.

In a fourth aspect, the invention provides a method of treating an exhaust gas from a lean burn engine comprising either contacting the exhaust gas with a $NO_x$ adsorber catalyst of the invention or passing the exhaust gas through an exhaust system of the invention.

BRIEF DESCRIPTION OF THE DRAWINGS

FIG. 1 shows a NOx adsorber catalyst having the first region (1) comprising a NOx adsorber material comprising a first molecular sieve catalyst, and a second region (2). The second region (2) may comprise a second molecular sieve catalyst. The first region (1) and the second region (2) are both disposed on a substrate (3) having an inlet end and an outlet end. The second region (2) is upstream (in a gas flow direction in use) of the first region (1).

FIG. 2 shows a NOx adsorber catalyst having a first region (1) comprising a NOx adsorber material comprising a first molecular sieve catalyst and a second region/zone. The second region/zone may (2) comprise a second molecular sieve catalyst. There is an overlap between the first region and the second region/zone. A part of the first region is disposed on the second region/zone. Both the first region and the second region/zone are disposed on the substrate (3).

FIG. 3 shows a NOx adsorber catalyst having a first region (1) comprising a NOx adsorber material comprising a first molecular sieve catalyst and a second region/zone (2). The second region/zone (2) may comprise a second molecular sieve catalyst. There is an overlap between the first region/zone and the second region. A part of the second region is disposed on the first region/zone. Both the first region/zone and the second region are disposed on the substrate (3).

FIG. 4 shows a NOx adsorber catalyst having a first layer (1) comprising a NOx adsorber material comprising a first molecular sieve catalyst disposed on a second layer (2). The second layer (2) may comprise a second molecular sieve catalyst. The second layer is disposed on the substrate (3).

FIG. 5 shows a NOx adsorber catalyst having a second layer (2) disposed on a first layer (1) comprising a NOx adsorber material comprising a second molecular sieve catalyst. The second layer (2) may comprise a second molecular sieve catalyst. The first layer is disposed on the substrate (3).

FIG. 6 shows a NOx adsorber catalyst having a layer (4) comprising a diesel oxidation catalyst material disposed on a first layer, wherein the first layer comprises a first region (1) and a second region (2). The first region (1) comprises a $NO_x$ adsorber material comprising a first molecular sieve catalyst. The second region (2) comprises a nitrogen dioxide reducing material, a second molecular sieve catalyst, or both. The first region (1) is disposed downstream of the second region (2). The first region (1) and the second region (2) are both disposed on a substrate (3).

FIG. 7 shows a NOx adsorber catalyst having a layer (4) comprising a diesel oxidation catalyst material disposed on a first layer, wherein the first layer comprises a first region (1) and a second region (2). The first region (1) comprises a $NO_x$ adsorber material comprising a first molecular sieve catalyst. The second region (2) comprises a second molecular sieve catalyst, a nitrogen dioxide reduction material, or both. The first region (1) is disposed downstream of the second region (2). The first region (1) and the second region (2) are both disposed on a substrate (3).

DEFINITIONS

Figure 1:
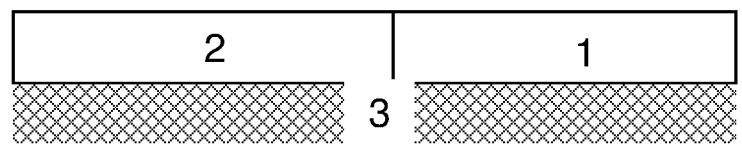
FIGS. 1 to 7 are schematic representations of passive NOx adsorbers of the invention.

The term "region" as used herein refers to an area of washcoat on a substrate. A "region" can, for example, be disposed or supported on a substrate as a "layer" or a "zone". The area or arrangement of a washcoat on a substrate is generally controlled during the process of applying the washcoat to the substrate. The "region" typically has distinct boundaries or edges (i.e. it is possible to distinguish one region from another region using conventional analytical techniques).

Typically, the "region" has a substantially uniform length. The reference to a "substantially uniform length" in this context refers to a length that does not deviate (e.g. the difference between the maximum and minimum length) by more than 10%, preferably does not deviate by more than 5%, more preferably does not deviate by more than 1%, from its mean value.

It is preferable that each "region" has a substantially uniform composition (i.e. there is no substantial difference in the composition of the washcoat when comparing one part of the region with another part of that region). Substantially uniform composition in this context refers to a material (e.g. region) where the difference in composition when comparing one part of the region with another part of the region is 5% or less, usually 2.5% or less, and most commonly 1% or less.

The term "zone" as used herein refers to a region having a length that is less than the total length of the substrate, such as ≤75% of the total length of the substrate. A "zone" typically has a length (i.e. a substantially uniform length) of at least 5% (e.g. ≥5%) of the total length of the substrate.

The total length of a substrate is the distance between its inlet end and its outlet end (e.g. the opposing ends of the substrate).

Any reference to a "zone disposed at an inlet end of the substrate" used herein refers to a zone disposed or supported on a substrate where the zone is nearer to an inlet end of the substrate than the zone is to an outlet end of the substrate. Thus, the midpoint of the zone (i.e. at half its length) is nearer to the inlet end of the substrate than the midpoint is to the outlet end of the substrate. Similarly, any reference to a "zone disposed at an outlet end of the substrate" used herein refers to a zone disposed or supported on a substrate where the zone is nearer to an outlet end of the substrate than the zone is to an inlet end of the substrate. Thus, the midpoint of the zone (i.e. at half its length) is nearer to the outlet end of the substrate than the midpoint is to the inlet end of the substrate.

When the substrate is a wall-flow filter, then generally any reference to a "zone disposed at an inlet end of the substrate" refers to a zone disposed or supported on the substrate that is:

(a) nearer to an inlet end (e.g. open end) of an inlet channel of the substrate than the zone is to a closed end (e.g. blocked or plugged end) of the inlet channel, and/or
(b) nearer to a closed end (e.g. blocked or plugged end) of an outlet channel of the substrate than the zone is to an outlet end (e.g. open end) of the outlet channel.

Thus, the midpoint of the zone (i.e. at half its length) is (a) nearer to an inlet end of an inlet channel of the substrate than the midpoint is to the closed end of the inlet channel, and/or (b) nearer to a closed end of an outlet channel of the substrate than the midpoint is to an outlet end of the outlet channel.

Similarly, any reference to a "zone disposed at an outlet end of the substrate" when the substrate is a wall-flow filter refers to a zone disposed or supported on the substrate that is:

(a) nearer to an outlet end (e.g. an open end) of an outlet channel of the substrate than the zone is to a closed end (e.g. blocked or plugged) of the outlet channel, and/or
(b) nearer to a closed end (e.g. blocked or plugged end) of an inlet channel of the substrate than it is to an inlet end (e.g. an open end) of the inlet channel.

Thus, the midpoint of the zone (i.e. at half its length) is (a) nearer to an outlet end of an outlet channel of the substrate than the midpoint is to the closed end of the outlet channel, and/or (b) nearer to a closed end of an inlet channel of the substrate than the midpoint is to an inlet end of the inlet channel.

A zone may satisfy both (a) and (b) when the washcoat is present in the wall of the wall-flow filter (i.e. the zone is in-wall).

The term "washcoat" is well known in the art and refers to an adherent coating that is applied to a substrate usually during production of a catalyst.

The term "noble metal" as used herein refers to generally refers to a metal selected from the group consisting of ruthenium, rhodium, palladium, silver, osmium, iridium, platinum, and gold. In general, the term "noble metal" preferably refers to a metal selected from the group consisting of rhodium, platinum, palladium and gold.

The acronym "PGM" as used herein refers to "platinum group metal". The term "platinum group metal" generally refers to a metal selected from the group consisting of Ru, Rh, Pd, Os, Ir and Pt, preferably a metal selected from the group consisting of Ru, Rh, Pd, Ir and Pt. In general, the term "PGM" preferably refers to a metal selected from the group consisting of Rh, Pt and Pd.

The term "adsorber" as used herein, particularly in the context of a $NO_x$ adsorber, should not be construed as being limited to the storage or trapping of a chemical entity (e.g. $NO_x$) only by means of adsorption. The term "adsorber" used herein is synonymous with "absorber".

The term "mixed oxide" as used herein generally refers to a mixture of oxides in a single phase, as is conventionally known in the art. The term "composite oxide" as used herein generally refers to a composition of oxides having more than one phase, as is conventionally known in the art.

The expression "consist essentially" as used herein limits the scope of a feature to include the specified materials, and any other materials or steps that do not materially affect the basic characteristics of that feature, such as for example minor impurities. The expression "consist essentially of" embraces the expression "consisting of".

The expression "substantially free of" as used herein with reference to a material, typically in the context of the content of a region, a layer or a zone, means that the material in a minor amount, such as ≤5% by weight, preferably ≤2% by weight, more preferably ≤1% by weight. The expression "substantially free of" embraces the expression "does not comprise".

Any reference to an amount of dopant, particularly a total amount, expressed as a % by weight as used herein refers to the weight of the support material or the refractory metal oxide thereof.

The term "loading" as used herein refers to a measurement in units of $g/ft^3$ on a metal weight basis.

DETAILED DESCRIPTION OF THE INVENTION

The NOx adsorber catalyst of the invention is for use as a passive NOx adsorber (PNA). The NOx adsorber catalyst comprises, or may consist essentially of, a NOx adsorber catalyst for treating an exhaust gas from a diesel engine comprising:

a first region comprising a NOx adsorber material comprising a first molecular sieve catalyst, wherein the first molecular sieve catalyst comprises a first noble metal and a first molecular sieve, and wherein the first molecular sieve contains the noble metal;

wherein the first molecular sieve has an STI Framework Type.

In general, the $NO_x$ adsorber material is a passive $NO_x$ adsorber (PNA) catalyst (i.e. it has PNA activity).

The first region comprises, or may consist essentially of, a $NO_x$ adsorber material. The $NO_x$ adsorber material comprises, or consists essentially of, a first molecular sieve catalyst. The first molecular sieve catalyst comprises, consists essentially of, or consists of, a first noble metal and a first molecular sieve. The first molecular sieve contains the first noble metal. The first molecular sieve catalyst can be prepared according to the method described in WO 2012/166868.

The first noble metal is typically selected from the group consisting of palladium (Pd), platinum (Pt), rhodium (Rh), gold (Au), silver (Ag), iridium (Ir), ruthenium (Ru) and mixtures of two or more thereof. Preferably, the first noble metal is selected from the group consisting of palladium (Pd), platinum (Pt) and rhodium (Rh). More preferably, the first noble metal is selected from palladium (Pd), platinum (Pt) and a mixture thereof.

Generally, it is preferred that the first noble metal comprises, or consists of, palladium (Pd) and optionally a second metal selected from the group consisting of platinum (Pt), rhodium (Rh), gold (Au), silver (Ag), iridium (Ir) and ruthenium (Ru). Preferably, the first noble metal comprises, or consists of, palladium (Pd) and optionally a second metal selected from the group consisting of platinum (Pt) and rhodium (Rh). Even more preferably, the first noble metal comprises, or consists of, palladium (Pd) and optionally platinum (Pt). More preferably, the first molecular sieve catalyst comprises palladium (Pd) as the only noble metal.

When the first noble metal comprises, or consists of, palladium (Pd) and a second metal, then the ratio by mass of palladium (Pd) to the second metal is >1:1. More preferably, the ratio by mass of palladium (Pd) to the second metal is >1:1 and the molar ratio of palladium (Pd) to the second metal is >1:1.

The first molecular sieve catalyst may further comprise a base metal. Thus, the first molecular sieve catalyst may comprise, or consist essentially of, a first noble metal, a first molecular sieve and optionally a base metal. The first molecular sieve contains the noble metal and optionally the base metal.

The base metal may be selected from the group consisting of iron (Fe), copper (Cu), manganese (Mn), chromium (Cr), cobalt (Co), nickel (Ni), zinc (Zn) and tin (Sn), as well as mixtures of two or more thereof. It is preferred that the base metal is selected from the group consisting of iron, copper and cobalt, more preferably iron and copper. Even more preferably, the base metal is iron.

Alternatively, the first molecular sieve catalyst may be substantially free of a base metal, such as a base metal selected from the group consisting of iron (Fe), copper (Cu), manganese (Mn), chromium (Cr), cobalt (Co), nickel (Ni), zinc (Zn) and tin (Sn), as well as mixtures of two or more thereof. Thus, the first molecular sieve catalyst may not comprise a base metal.

In general, it is preferred that the first molecular sieve catalyst does not comprise a base metal.

It may be preferable that the first molecular sieve catalyst is substantially free of barium (Ba), more preferably the first molecular sieve catalyst is substantially free of an alkaline earth metal. Thus, the first molecular sieve catalyst may not comprise barium, and preferably the first molecular sieve catalyst does not comprise an alkaline earth metal.

The first molecular sieve is typically composed of aluminium, silicon, and optionally phosphorus. The first molecular sieve generally has a three-dimensional arrangement (e.g. framework) of $SiO_4$, $AlO_4$, and/or $PO_4$ that are joined by the sharing of oxygen atoms. The first molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the first molecular sieve has an aluminosilicate framework, an aluminophosphate framework or a silico-aluminophosphate framework. The first molecular sieve may have an aluminosilicate framework or an aluminophosphate framework. It is preferred that the first molecular sieve has an aluminosilicate framework or a silico-aluminophosphate framework. More preferably, the first molecular sieve has an aluminosilicate framework.

When the first molecular sieve has an aluminosilicate framework, then the first molecular sieve is preferably a zeolite.

The first molecular sieve contains the first noble metal. The first noble metal is typically supported on the first molecular sieve. For example, the first noble metal may be loaded onto and supported on the first molecular sieve, such as by ion-exchange. Thus, the first molecular sieve catalyst may comprise, or consist essentially of, a first noble metal and a first molecular sieve, wherein the first molecular sieve contains the first noble metal and wherein the first noble metal is loaded onto and/or supported on the first molecular sieve by ion exchange.

In general, the first molecular sieve may be a metal-substituted molecular sieve (e.g. metal-substituted molecular sieve having an aluminosilicate or an aluminophosphate framework). The metal of the metal-substituted molecular sieve may be the first noble metal (e.g. the molecular sieve is a noble metal substituted molecular sieve). Thus, the first molecular sieve containing the first noble metal may be a noble metal substituted molecular sieve. When the first molecular sieve catalyst comprises a base metal, then the first molecular sieve may be a noble and base metal-substituted molecular sieve. For the avoidance of doubt, the term "metal-substituted" embraces the term "ion-exchanged".

The first molecular sieve catalyst generally has at least 0.1, preferably at least 0.2, more preferably at least 0.3 and especially preferably at least 0.5% by weight (i.e. of the amount of noble metal of the molecular sieve catalyst) of the first noble metal located inside pores of the first molecular sieve, preferably at least 1% by weight, and particularly preferably at least 2% by weight. In some embodiments, the first molecular sieve catalyst may have at least 5, preferably at least 10% by weight of the first noble metal located inside pores of the first molecular sieve.

The first molecular sieve has an STI Framework Type. STI zeolite has a medium pore 2-dimensional framework network consisting of two sets of interconnected channels: a 10-membered ring in the [100] direction with 0.49×0.62 nm window openings and an 8-membered ring in the [101] direction with 0.27×0.56 nm window openings. The framework is made up of STI and BRE composite building units. Materials with this framework type include (according to the International Zeolite Association) but are not limited to: Stilbite, Barrerite, Stellerite, Synthetic barrerite, Synthetic stellerite, Synthetic stilbite, and TNU-10.

The first molecular sieve typically has a silica to alumina molar ratio (SAR) of 1 to 200, such as 5 to 100, more preferably 5 to 80 (e.g. 5 to 40). The SAR generally relates to a molecule having an aluminosilicate framework (e.g. a zeolite) or a silico-aluminophosphate framework, preferably an aluminosilicate framework (e.g. a zeolite).

The first molecular sieve catalyst, particularly when the first molecular sieve is a zeolite, may have an infrared spectrum having a characteristic absorption peak in a range of from 750 cm$^{-1}$ to 1050 cm$^{-1}$ (in addition to the absorption peaks for the molecular sieve itself). Preferably, the characteristic absorption peak is in the range of from 800 cm$^{-1}$ to 1000 cm$^{-1}$, more preferably in the range of from 850 cm$^{-1}$ to 975 cm$^{-1}$.

The molecular sieve catalyst of the first molecular sieve catalyst embodiment has been found to have advantageous passive $NO_x$ adsorber (PNA) activity. The first molecular sieve catalyst can be used to store $NO_x$ when exhaust gas temperatures are relatively cool, such as shortly after start-up of a lean burn engine. $NO_x$ storage by the molecular sieve catalyst occurs at low temperatures (e.g. less than 200° C.). As the lean burn engine warms up, the exhaust gas temperature increases and the temperature of the molecular sieve catalyst will also increase. The molecular sieve catalyst will release adsorbed $NO_x$ at these higher temperatures (e.g. 200° C. or above).

It has also been unexpectedly found that the first molecular sieve catalyst has cold start catalyst activity. Such activity can reduce emissions during the cold start period by adsorbing $NO_x$ and hydrocarbons (HCs) at relatively low exhaust gas temperatures (e.g. less than 200° C.). Adsorbed $NO_x$ and/or HCs can be released when the temperature of the molecular sieve catalyst is close to or above the effective temperature of the other catalyst components or emissions control devices for oxidising NO and/or HCs.

The $NO_x$ adsorber catalyst may also additionally comprise a second molecular sieve.

The second molecular sieve is typically composed of aluminium, silicon, and optionally phosphorus. The second molecular sieve generally has a three-dimensional arrangement (e.g. framework) of $SiO_4$, $AlO_4$, and/or $PO_4$ that are joined by the sharing of oxygen atoms. The second molecular sieve may have an anionic framework. The charge of the anionic framework may be counterbalanced by cations, such as by cations of alkali and/or alkaline earth elements (e.g., Na, K, Mg, Ca, Sr, and Ba), ammonium cations and/or protons.

Typically, the second molecular sieve has an aluminosilicate framework, an aluminophosphate framework, a silicoaluminophosphate framework, a metal-substituted aluminosilicate framework, a metal-substituted aluminophosphate framework, or a metal-substituted silicoaluminophosphate framework. Preferably the second molecular sieve has an aluminosilicate framework, an aluminophosphate framework or a silico-aluminophosphate framework. The second molecular sieve may have an aluminosilicate framework or an aluminophosphate framework. It is particularly preferred that the second molecular sieve has an aluminosilicate framework or a silico-aluminophosphate framework. More preferably, the second molecular sieve has an aluminosilicate framework.

When the second molecular sieve has an aluminosilicate framework, then the second molecular sieve is preferably a zeolite.

The second molecular sieve may be selected from a small pore molecular sieve (i.e. a molecular sieve having a maximum ring size of eight tetrahedral atoms), a medium pore molecular sieve (i.e. a molecular sieve having a maximum ring size of ten tetrahedral atoms) and a large pore molecular sieve (i.e. a molecular sieve having a maximum ring size of twelve tetrahedral atoms). More preferably, the second molecular sieve is selected from a small pore molecular sieve and a medium pore molecular sieve.

In one preferred embodiment, the second molecular sieve is a small pore molecular sieve. The small pore molecular sieve preferably has a Framework Type selected from the group consisting of ACO, AEI, AEN, AFN, AFT, AFX, ANA, APC, APD, ATT, CDO, CHA, CON, CSV, DDR, DFT, EAB, EDI, EPI, ERI, EUO, GIS, GME, GOO, IFR, IHW, ITE, ITW, LEV, KFI, MER, MFS, MON, MOR, MTW, MWW, NES, NSI, OWE, PAU, PHI, RHO, RTH, SAT, SAV, SEW, SFS, SIV, STF, SVR, SZR, THO, TSC, UEI, UFI, VNI, YUG and ZON, as well as a mixture or intergrowth of any two or more thereof. The intergrowth is preferably selected from KFI-SIV, ITE-RTH, AEW-UEI, AEI-CHA, and AEI-SAV. More preferably, the small pore molecular sieve has a Framework Type that is AEI, CHA or an AEI-CHA intergrowth. Even more preferably, the small pore molecular sieve has a Framework Type that is AEI or CHA, particularly AEI.

Preferably, the small pore molecular sieve has an aluminosilicate framework or a silico-aluminophosphate framework. More preferably, the small pore molecular sieve has an aluminosilicate framework (i.e. the second molecular sieve is a zeolite), especially when the small pore molecular sieve has a Framework Type that is AEI, CHA or an AEI-CHA intergrowth, particularly AEI or CHA.

In a further preferred embodiment, the second molecular sieve has a Framework Type selected from the group consisting of AEI, MFI, EMT, ERI, MOR, FER, BEA, FAU, CHA, LEV, MWW, CON and EUO, as well as mixtures of any two or more thereof.

In a further preferred embodiment, the second molecular sieve is a medium pore molecular sieve. The medium pore molecular sieve preferably has a Framework Type selected from the group consisting of MFI, FER, MWW and EUO, more preferably MFI.

In a further preferred embodiment, the second molecular sieve is a large pore molecular sieve. The large pore molecular sieve preferably has a Framework Type selected from the group consisting of CON, BEA, FAU, MOR and EMT, more preferably BEA.

In each of these aforementioned embodiments, the second molecular sieve preferably has an aluminosilicate framework (e.g. the molecular sieve is a zeolite). Each of the aforementioned three-letter codes represents a framework type in accordance with the "IUPAC Commission on Zeolite Nomenclature" and/or the "Structure Commission of the International Zeolite Association".

In any of these aforementioned embodiments, it may generally be preferred that the second molecular sieve (e.g. large pore, medium pore or small pore) has a framework that is not an intergrowth of at least two different Framework Types.

The second molecular sieve typically has a silica to alumina molar ratio (SAR) of to 200 (e.g. 10 to 40), such as 10 to 100, more preferably 15 to 80 (e.g. 15 to 30). The SAR generally relates to a molecule having an aluminosilicate framework (e.g. a zeolite) or a silico-aluminophosphate framework, preferably an aluminosilicate framework (e.g. a zeolite).

The second molecular sieve catalyst, where present, may be present in the first region. Additionally, or alternatively, the NOx adsorber catalyst may comprise a second molecular sieve catalyst wherein the second molecular sieve catalyst is not present in the first region.

The $NO_x$ adsorber catalyst may also additionally comprise a first inorganic oxide.

Preferred first inorganic oxides preferably have a surface area in the range 10 to 1500 $m^2/g$, pore volumes in the range 0.1 to 4 mL/g, and pore diameters from about 10 to 1000 Angstroms. High surface area inorganic oxides having a surface area greater than 80 $m^2/g$ are particularly preferred, e.g. high surface area ceria or alumina. Other preferred first inorganic oxides include magnesia/alumina composite oxides, optionally further comprising a cerium-containing component, e.g. ceria. In such cases the ceria may be present on the surface of the magnesia/alumina composite oxide, e.g. as a coating.

Preferably the at least one inorganic oxide comprises an inorganic oxide doped with a dopant, wherein the dopant is an element selected from the group consisting of tungsten (W), silicon (Si), titanium (Ti), lanthanum (La), praseodymium (Pr), hafnium (Hf), yttrium (Y), ytterbium (Yb), samarium (Sm), neodymium (Nd) and a combination of two or more thereof, or an oxide thereof.

The first inorganic oxide, where present, may be present in the first region. Additionally, or alternatively, the NOx adsorber catalyst may comprise a first inorganic oxide wherein the first inorganic oxide is not present in the first region.

The NOx adsorber catalyst may comprise a second region. For the avoidance of doubt, the second region is a separate, i.e. distinct, region to the first region. The second region may comprise the second molecular sieve catalyst, the first inorganic oxide, or a mixture (i.e. blend) of any combination of the first molecular sieve catalyst, the second molecular sieve catalyst, and the first inorganic oxide.

Alternatively, the second region may comprise a nitrogen dioxide reduction material. The nitrogen dioxide reduction material comprises at least one inorganic oxide (i.e. a second inorganic oxide). The at least one inorganic oxide is preferably an oxide of Groups 2, 3, 4, 5, 13 and 14 elements. The at least one inorganic oxide is preferably selected from the group consisting of alumina, ceria, magnesia, silica, titania, zirconia, niobia, tantalum oxides, molybdenum oxides, tungsten oxides, and mixed oxides or composite oxides thereof. Particularly preferably, the at least one inorganic oxide comprises alumina, ceria, or a magnesia/alumina composite oxide. One especially preferred inorganic oxide is alumina. In embodiments wherein the at least one inorganic oxide comprises alumina, the at least one inorganic oxide may consist essentially of alumina, and may particularly preferably consist of alumina.

The NOx adsorber catalyst of the invention may have one of several arrangements that facilitate the storage and release of NOx, and which may provide a broader temperature window for NOx storage and release.

In a first arrangement, the NOx adsorber catalyst comprises, consists essentially of, or consists of the first region.

The first region may be disposed or supported on a substrate. It is preferred that the first region is directly disposed or directly supported on the substrate (i.e. the first region is in direct contact with a surface of the substrate).

In a second arrangement, the NOx adsorber catalyst comprises, consists essentially of, or consists of the first region and the second region.

An example of a second arrangement of the NOx adsorber catalyst is illustrated in FIG. 1. In the arrangement illustrated in FIG. 1, the NOx adsorber catalyst comprises a first zone and a second zone.

The first region (1) may be disposed or supported on the substrate (3). It is preferred that the first region is directly disposed or directly supported on the substrate (i.e. the first region is in direct contact with a surface of the substrate).

In the second arrangement, the first region may be a first zone. The first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In the second arrangement, the second region (2) may be a second zone. The second zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

The first zone may be disposed upstream of the second zone. Alternatively, the first zone may be disposed downstream of the second zone. It is preferred that the second zone is disposed upstream of the first zone, as illustrated in FIG. 1.

The first zone comprises, or consists essentially of, a NOx adsorber material comprising a first molecular sieve catalyst. The second zone comprises, or consists essentially of, a second molecular sieve catalyst.

When the first zone is disposed upstream of the second zone, then the first zone may be disposed at an inlet end of the substrate and/or the second zone may be disposed at an outlet end of the substrate.

When the first zone is disposed downstream of the second zone, then the first zone may be disposed at an outlet end of the substrate and/or the second zone may be disposed at an inlet end of the substrate.

The first zone may adjoin the second zone. Preferably, the first zone is contact with the second zone.

When the first zone adjoins and/or is in contact with the second zone, then the combination of the first zone and the second zone may be disposed or supported on the substrate as a layer (e.g. a single layer). Thus, a layer (e.g. a single layer) may be formed on the substrate when the first and second zones adjoin or are in contact with one another. Such an arrangement may avoid problems with back pressure.

Typically, the first zone and/or the second zone is disposed or supported on the substrate. Preferably, the first zone and/or the second zone is disposed directly on to the substrate (i.e. the first zone and/or second zone is in contact with a surface of the substrate).

Figure 2:
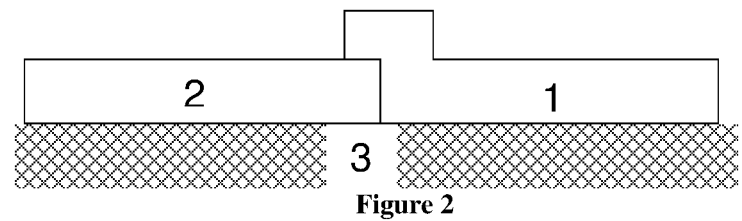
Figure 3:
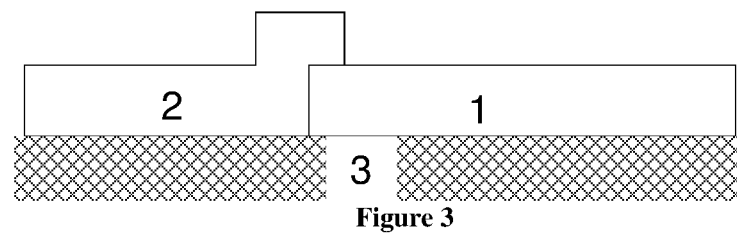

In a third arrangement, the $NO_x$ adsorber catalyst comprises a first region and a second region. The first region comprises, or consists essentially of, a NOx adsorber material comprising a first molecular sieve catalyst. The second region comprises, or consists essentially of, a second molecular sieve catalyst or a nitrogen dioxide reduction material comprising a second inorganic oxide, preferably a second molecular sieve catalyst. In the third arrangement, either the first region overlaps the second region (see, for example, FIG. 2) or the second region overlaps the first region (see, for example, FIG. 3).

The second region may be disposed directly on to the substrate (i.e. the second region is in contact with a surface of the substrate). The first region may be:

(a) disposed or supported on the second region; and/or (b) disposed directly on to the substrate [i.e. the first region is in contact with a surface of the substrate]; and/or (c) in contact with the second region [i.e. the first region is adjacent to, or abuts, the second region].

A part or portion of the first region may be disposed or supported on the second region (e.g. the first region may overlap the second region). See, for example, the arrangement illustrated in FIG. 2. The second region may be a second zone and the first region may be a first layer or a first zone.

When a part or portion of the first region is disposed or supported on the second region, then preferably the part or portion of the first region is disposed directly on to the second region (i.e. the first region is in contact with a surface of the second region).

Alternatively, a part or portion of the second region may be disposed or supported on the first region (e.g. the second region may overlap the first region). See, for example, the arrangement illustrated in FIG. 3. The first region may be a first zone and the second region may be a second layer or a second zone.

When a part or portion of the second region is disposed or supported on the first region, then preferably the part or portion of the second region is disposed directly on to the first region (i.e. the second region is in contact with a surface of the first region).

In the third arrangement, the first region may be disposed upstream of the second region. For example, the first region may be disposed at an inlet end of the substrate and the second region may be disposed at an outlet end of the substrate.

Alternatively, the first region may be disposed downstream of the second region. For example, the first region may be disposed at an outlet end of the substrate and the second region may be disposed at an inlet end of the substrate.

In the third arrangement, the second region may be a second layer and the first region may be a first zone, wherein the first zone is disposed on the second layer. Preferably the first zone is disposed directly on to the second layer (i.e. the first zone is in contact with a surface of the second layer). Alternatively, the first region may be a first layer and the second region may be a second zone, wherein the second zone is disposed on the first layer. Preferably the second zone is disposed directly on to the first layer (i.e. the second zone is in contact with a surface of the first layer).

When the first zone is disposed or supported on the second layer, it is preferred that the entire length of the first zone is disposed or supported on the second layer. The length of the first zone is less than the length of the second layer. It is preferred that first zone is disposed on the second layer at an outlet end of the substrate.

When the second zone is disposed or supported on the first layer, it is preferred that the entire length of the second zone is disposed or supported on the first layer. The length of the second zone is less than the length of the first layer. It is preferred that second zone is disposed on the first layer at an inlet end of the substrate.

In a fourth arrangement, the $NO_x$ adsorber catalyst comprises a first layer and a second layer. The first layer comprises, or consists essentially of, a $NO_x$ adsorber material comprising a first molecular sieve catalyst. The second layer comprises, or consists essentially of, a second molecular sieve catalyst.

Figure 4:
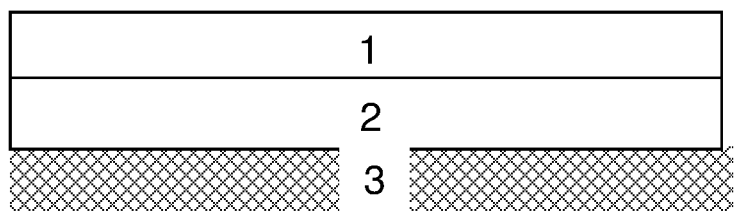

The first layer may be disposed on, preferably disposed directly on to, the second layer (see, for example, the arrangement illustrated in FIG. 4). The second layer may be disposed on the substrate. Preferably, the second layer is disposed directly on to the substrate.

Figure 5:
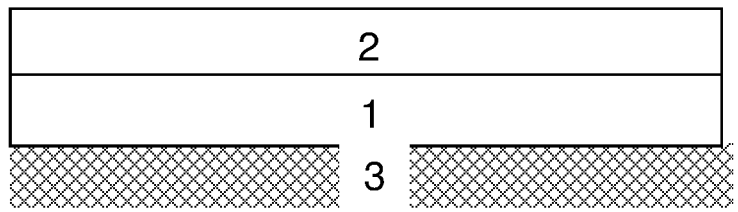

Alternatively, the second layer may be disposed on, preferably disposed directly on to, the first layer (see, for example, the arrangement illustrated in FIG. 5). The first layer may be disposed on the substrate. Preferably, the first layer is disposed directly on to the substrate. This example of the fourth arrangement, i.e. the arrangement shown in FIG. 5, is particularly preferred.

The NOx adsorber catalyst of the invention may be advantageous in certain applications, e.g. when the $NO_x$ adsorber catalyst is disposed upstream of a SCR or SCRF™ catalyst. In such arrangements, it may be advantageous for the $NO_x$ release temperature of the $NO_x$ adsorber catalyst of the invention to be higher than conventional $NO_x$ adsorber catalysts, to ensure that $NO_x$ is not released from the $NO_x$ adsorber catalyst until the downstream SCR or SCRF™ catalyst is at a sufficiently high temperature to be catalytically active in the reduction of $NO_x$ to $N_2$. Thus the NOx adsorber catalyst of the invention may be particularly advantageous in reducing NOx emissions from an exhaust stream, e.g. an exhaust stream of a lean burn engine, such as a diesel engine (preferably a light duty diesel engine).

For the avoidance of doubt, the first region is different (i.e. different composition) to the second region.

In general, with reference to the second and third arrangements, when the first region is a first zone, then the first zone typically has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

When the second region is a second zone, then generally the second zone has a length of 10 to 90% of the length of the substrate (e.g. 10 to 45%), preferably 15 to 75% of the length of the substrate (e.g. 15 to 40%), more preferably 20 to 70% (e.g. 30 to 65%, such as 25 to 45%) of the length of the substrate, still more preferably 25 to 65% (e.g. 35 to 50%).

In the second to fourth arrangements, when the first region is a first layer, then typically the first layer extends for an entire length (i.e. substantially an entire length) of the substrate, particularly the entire length of the channels of a substrate monolith.

In general, when the second region is a second layer, then typically the second layer typically extends for an entire length (i.e. substantially an entire length) of the substrate, particularly the entire length of the channels of a substrate monolith.

In the second to fourth arrangements, the first region is preferably substantially free of rhodium and/or a $NO_x$ storage component comprising, or consisting essentially of, an oxide, a carbonate or a hydroxide of an alkali metal, an alkaline earth metal and/or a rare earth metal. More preferably, the first region does not comprise rhodium and/or a NOx storage component comprising, or consisting essentially of, an oxide, a carbonate or a hydroxide of an alkali metal, an alkaline earth metal and/or a rare earth metal. Thus, the first region is preferably not a lean $NO_x$ trap (LNT) region (i.e. a region having lean $NO_x$ trap activity).

Additionally or alternatively in the second to fourth arrangements, the second region is preferably substantially free of rhodium and/or a NOx storage component comprising, or consisting essentially of, an oxide, a carbonate or a hydroxide of an alkali metal, an alkaline earth metal and/or a rare earth metal (except for an oxide of cerium (i.e. from the second NOx adsorber material)). More preferably, the second region does not comprise rhodium and/or a NOx storage component comprising, or consisting essentially of, an oxide, a carbonate or a hydroxide of an alkali metal, an alkaline earth metal and/or a rare earth metal (except for an oxide of cerium). Thus, the second region is preferably not a lean NOx trap (LNT) region (i.e. a region having lean NOx trap activity).

In a fifth arrangement of the invention, the NOx adsorber catalyst has an arrangement as defined in any one of the first to fourth arrangements described above and further comprises a diesel oxidation catalyst (DOC) region. The DOC region has diesel oxidation catalyst activity. Thus, the DOC region is able to oxidise carbon monoxide (CO) and/or hydrocarbons (HCs) and optionally nitric oxide (NO).

The DOC region may be a DOC zone. The DOC zone typically has a length of 10 to 90% (e.g. 10 to 45%) of the length of the substrate, preferably 15 to 75% of the length of the substrate (e.g. 15 to 40%), more preferably 20 to 60% (e.g. 30 to 55% or to 45%) of the length of the substrate, still more preferably 25 to 50% (e.g. 25 to 40%).

The DOC region is preferably disposed upstream of the first region and the second region. It is preferred that the DOC region is disposed at an inlet end of the substrate. More preferably, the DOC region is a DOC zone disposed at an inlet end of the substrate.

Alternatively, the DOC region may be a DOC layer. The DOC layer may extend for an entire length (i.e. substantially an entire length) of the substrate, particularly the entire length of the channels of a substrate monolith.

The DOC layer is preferably disposed on the first region and/or the second region. Thus, the DOC layer will come into contact with an inlet exhaust gas before the first region and/or the second region.

In a preferred example of the fifth arrangement, the DOC region (4) is a DOC layer or a DOC zone, preferably a DOC layer, disposed on (preferably disposed directly on) at least a part or a portion of both the first region and the second region as hereinbefore described. In a particularly preferred example, the DOC region is a DOC layer disposed on (preferably disposed directly on) a first layer, wherein said first layer comprises a first region and a second region. In such an arrangement, the first region (i.e. a first region comprising a $NO_x$ adsorber material comprising a first molecular sieve catalyst) is disposed downstream of the second region (i.e. a second region comprising a second molecular sieve catalyst). The first region and the second region are both disposed on (preferably disposed directly on) a substrate. This preferred arrangement is shown in FIG. 6 and FIG. 7.

Figure 6:
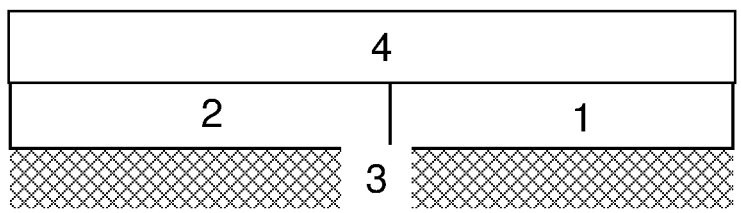
Figure 7:
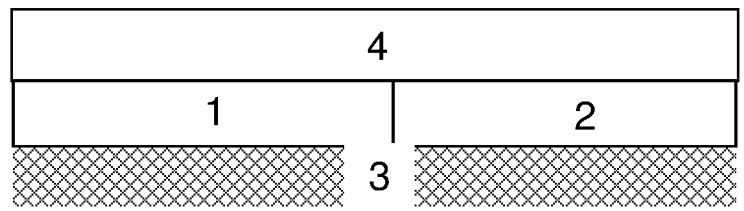

For the avoidance of doubt, in the arrangements shown in FIG. 6 and FIG. 7, the DOC region may be a layer and/or a zone as hereinbefore described.

The NOx adsorber catalyst of the invention, including any one of the first to fifth arrangements, preferably does not comprise a SCR catalyst (e.g. a region comprising a SCR catalyst), particularly a SCR catalyst comprising a metal selected from the group consisting of cerium (Ce), chromium (Cr), cobalt (Co), copper (Cu), iron (Fe), manganese (Mn), molybdenum (Mo), nickel (Ni), tungsten (W), vanadium (V) or a combination of any two or more thereof.

The regions, zones and layers described hereinabove may be prepared using conventional methods for making and applying washcoats onto a substrate are also known in the art (see, for example, our WO 99/47260, WO 2007/077462 and WO 2011/080525).

The first region of the first to fifth arrangements typically comprise a total loading of noble metal (i.e. of the noble metal of the molecular sieve catalyst in the first region) of 5 to 550 g ft$^{-3}$, preferably 15 to 400 g ft$^{-3}$ (e.g. 75 to 350 g ft$^{-3}$), more preferably 25 to 300 g ft$^{-3}$ (e.g. 50 to 250 g ft$^{-3}$), still more preferably 30 to 150 g ft$^{-3}$.

The $NO_x$ adsorber catalyst of the invention preferably comprises a substrate having an inlet end and an outlet end.

The substrate typically has a plurality of channels (e.g. for the exhaust gas to flow through). Generally, the substrate is a ceramic material or a metallic material.

It is preferred that the substrate is made or composed of cordierite ($SiO_2$—$Al_2O_3$—$MgO$), silicon carbide (SiC), Fe—Cr—Al alloy, Ni—Cr—Al alloy, or a stainless steel alloy.

Typically, the substrate is a monolith (also referred to herein as a substrate monolith). Such monoliths are well-known in the art. The substrate monolith may be a flow-through monolith or a filtering monolith.

A flow-through monolith typically comprises a honeycomb monolith (e.g. a metal or ceramic honeycomb monolith) having a plurality of channels extending therethrough, which each channel is open at the inlet end and the outlet end.

A filtering monolith generally comprises a plurality of inlet channels and a plurality of outlet channels, wherein the inlet channels are open at an upstream end (i.e. exhaust gas inlet side) and are plugged or sealed at a downstream end (i.e. exhaust gas outlet side), the outlet channels are plugged or sealed at an upstream end and are open at a downstream end, and wherein each inlet channel is separated from an outlet channel by a porous structure.

When the monolith is a filtering monolith, it is preferred that the filtering monolith is a wall-flow filter. In a wall-flow filter, each inlet channel is alternately separated from an outlet channel by a wall of the porous structure and vice versa. It is preferred that the inlet channels and the outlet channels are arranged in a honeycomb arrangement. When there is a honeycomb arrangement, it is preferred that the channels vertically and laterally adjacent to an inlet channel are plugged at an upstream end and vice versa (i.e. the channels vertically and laterally adjacent to an outlet channel are plugged at a downstream end). When viewed from either end, the alternately plugged and open ends of the channels take on the appearance of a chessboard.

In principle, the substrate may be of any shape or size. However, the shape and size of the substrate is usually selected to optimise exposure of the catalytically active materials in the catalyst to the exhaust gas. The substrate may, for example, have a tubular, fibrous or particulate form. Examples of suitable supporting substrates include a substrate of the monolithic honeycomb cordierite type, a substrate of the monolithic honeycomb SiC type, a substrate of the layered fibre or knitted fabric type, a substrate of the foam type, a substrate of the crossflow type, a substrate of the metal wire mesh type, a substrate of the metal porous body type and a substrate of the ceramic particle type.

The substrate may be an electrically heatable substrate (i.e. the electrically heatable substrate is an electrically heating substrate, in use). When the substrate is an electrically heatable substrate, the $NO_x$ adsorber catalyst of the invention comprises an electrical power connection, preferably at least two electrical power connections, more preferably only two electrical power connections. Each electrical power connection may be electrically connected to the electrically heatable substrate and an electrical power source. The $NO_x$ adsorber catalyst can be heated by Joule heating, where an electric current through a resistor converts electrical energy into heat energy.

The electrically heatable substrate can be used to release any stored $NO_x$ from the first region. Thus, when the electrically heatable substrate is switched on, the $NO_x$ adsorber catalyst will be heated and the temperature of the first molecular sieve catalyst can be brought up to its $NO_x$ release temperature. Examples of suitable electrically heatable substrates are described in U.S. Pat. Nos. 4,300,956, 5,146,743 and 6,513,324.

In general, the electrically heatable substrate comprises a metal. The metal may be electrically connected to the electrical power connection or electrical power connections.

Typically, the electrically heatable substrate is an electrically heatable honeycomb substrate. The electrically heatable substrate may be an electrically heating honeycomb substrate, in use.

The electrically heatable substrate may comprise an electrically heatable substrate monolith (e.g. a metal monolith). The monolith may comprise a corrugated metal sheet or foil. The corrugated metal sheet or foil may be rolled, wound or stacked. When the corrugated metal sheet is rolled or wound, then it may be rolled or wound into a coil, a spiral shape or a concentric pattern.

The metal of the electrically heatable substrate, the metal monolith and/or the corrugated metal sheet or foil may comprise an aluminium ferritic steel, such as Fecralloy™.

Typically, the $NO_x$ adsorber catalyst releases $NO_x$ at a temperature greater than 200° C. Preferably, the $NO_x$ adsorber catalyst releases $NO_x$ at a temperature of 220° C. or above, such as 230° C. or above, 240° C. or above, 250° C. or above, or 260° C. or above. By releasing NOx at a temperature greater than 200° C., the catalysts of the present invention have an improved release temperature overlap with the light-off temperature of a downstream catalytic device that is configured to catalytically reduce NOx, such as an SCR or SCRF™ catalyst, compared to passive NOx adsorber catalysts of the prior art. This improved release temperature overlap advantageously results in reduced NOx slippage from the exhaust system, as NOx is stored at a low temperature and released only when a downstream catalytic device is capable of carrying out the catalytic reduction of the NOx released from the passive NOx adsorber.

The $NO_x$ adsorber catalyst typically absorbs or stores $NO_x$ at a temperature of 250° C. or less. This is the upper limit of the first temperature range. Preferably, the $NO_x$ adsorber catalyst absorbs or stores $NO_x$ at a temperature of 220° C. or less, such as 200° C. or less, 190° C. or less, 180° C. or less, or 175° C. or less. Particularly preferably the $NO_x$ adsorber catalyst may begin to store $NO_x$ at a temperature of 100° C. or less, such as 80° C. or less. It is desirably for the $NO_x$ adsorber catalyst to begin to adsorb $NO_x$ at low temperatures, and ideally from the moment the engine that is in fluid communication with the catalyst begins operation. This low temperature $NO_x$ adsorption is advantageous as it reduces $NO_x$ slippage from the exhaust system during the cold start period, such as immediately after the engine has been switched on, or during engine idling in e.g. city driving conditions.

The $NO_x$ adsorber catalyst may preferentially absorb or store nitric oxide (NO). Thus, any reference to absorbing, storing or releasing $NO_x$ in this context may refer absorbing, storing or releasing nitric oxide (NO). Preferential absorption or storage of NO will decrease the ratio of $NO:NO_2$ in the exhaust gas.

The invention also provides an exhaust system comprising the $NO_x$ adsorber catalyst and an emissions control device. Examples of an emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC) and combinations of two or more thereof. Such emissions control devices are all well known in the art.

It is preferred that the exhaust system comprises an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a lean $NO_x$ trap (LNT), a selective catalytic reduction (SCR) catalyst, a selective catalytic reduction filter (SCRF™) catalyst, and combinations of two or more thereof.

In a preferred exhaust system of the invention, the emissions control device is a LNT. The $NO_x$ release temperature of the $NO_x$ adsorber catalyst of the invention may overlap with a $NO_x$ storage temperature of a LNT. The $NO_x$ adsorber catalyst of the invention may be used in conjunction with a LNT and a SCR or SCRF™ catalyst (e.g. an exhaust system comprising a PNA+LNT+SCR or SCRF™, in that order) to provide a broad temperature window for the storage and treatment of $NO_x$.

In general, the exhaust system of the invention may further comprise means for introducing hydrocarbon into the exhaust gas.

The means for introducing hydrocarbon into the exhaust gas may comprise, or consist of, a hydrocarbon supply apparatus (e.g. for generating a rich exhaust gas). The hydrocarbon supply apparatus may be electronically coupled to an engine management system, which is configured to inject hydrocarbon into the exhaust gas typically for releasing $NO_x$ (e.g. stored $NO_x$) from a LNT.

The hydrocarbon supply apparatus may be an injector. The hydrocarbon supply apparatus or injector is suitable for injecting fuel into the exhaust gas. The hydrocarbon supply apparatus is typically disposed downstream of the exhaust outlet of the lean burn engine. The hydrocarbon supply apparatus may be upstream or downstream of the $NO_x$ adsorber catalyst of the invention.

Alternatively or in addition to the hydrocarbon supply apparatus, the lean burn engine may comprise an engine management system (e.g. an engine control unit [ECU]). The engine management system may be configured for in-cylinder injection of the hydrocarbon (e.g. fuel) typically for releasing $NO_x$ (e.g. stored $NO_x$) from a LNT.

Generally, the engine management system is coupled to a sensor in the exhaust system, which monitors the status of a LNT. Such a sensor may be disposed downstream of the LNT. The sensor may monitor the $NO_x$ composition of the exhaust gas at the outlet of the LNT.

In general, the hydrocarbon is fuel, preferably diesel fuel. When the hydrocarbon is fuel, such as diesel fuel, it is preferred that the fuel comprises ≤50 ppm of sulfur, more preferably ≤15 ppm of sulfur, such as ≤10 ppm of sulfur, and even more preferably ≤5 ppm of sulfur.

In the first to fifth arrangements of the $NO_x$ adsorber catalyst of the invention, the hydrocarbon supply apparatus may be disposed upstream of the $NO_x$ adsorber catalyst of the invention.

When the exhaust system of the invention comprises an SCR catalyst or an SCRF™ catalyst, then the exhaust system may further comprise an injector for injecting a nitrogenous reductant, such as ammonia, or an ammonia precursor, such as urea or ammonium formate, preferably urea, into exhaust gas downstream of the oxidation catalyst and upstream of the SCR catalyst or the SCRF™ catalyst. Such an injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas. Ammonia can also be generated by heating ammonium carbamate (a solid) and the ammonia generated can be injected into the exhaust gas.

Alternatively or in addition to the injector for injecting a nitrogenous reductant, ammonia can be generated in situ (e.g. during rich regeneration of a LNT disposed upstream of the SCR catalyst or the SCRF™ catalyst), such as when the exhaust system further comprises a hydrocarbon supply apparatus, such as an engine management system configured for in-cylinder injection of a hydrocarbon for releasing $NO_x$ (e.g. stored $NO_x$) from a LNT.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$). Additionally or alternatively, the non-zeolite catalyst can also include Nb, Ce and oxides thereof, e.g. $NbO_x/CeO_2$ or $WO_x/CeO_2$.

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

Preferred molecular sieves for an SCR catalyst or an SCRF™ catalyst are synthetic aluminosilicate zeolite molecular sieves selected from the group consisting of AEI, AFX, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

In a first exhaust system embodiment of the invention, the exhaust system comprises the $NO_x$ adsorber catalyst of the invention (including any one of the first to fifth arrangements of the $NO_x$ adsorber catalyst) and a lean $NO_x$ trap (LNT) [i.e. an LNT on a separate substrate to the $NO_x$ adsorber catalyst]. Such an arrangement may be called a PNA/LNT. The $NO_x$ adsorber catalyst is typically followed by (e.g. is upstream of) the lean $NO_x$ trap (LNT). Thus, for example, an outlet of the $NO_x$ adsorber catalyst is connected, preferably directly connected (e.g. without an intervening emissions control device), to an inlet of the lean $NO_x$ trap (LNT). There may be a hydrocarbon supply apparatus between the $NO_x$ adsorber catalyst and the LNT.

A second exhaust system embodiment relates to an exhaust system comprising the $NO_x$ adsorber catalyst of the invention (including any one of the first to fifth arrangements of the $NO_x$ adsorber catalyst) and a selective catalytic reduction (SCR) catalyst. Such an arrangement may be called a PNA/SCR. The $NO_x$ adsorber catalyst is typically followed by (e.g. is upstream of) the selective catalytic reduction (SCR) catalyst. Thus, for example, an outlet of the $NO_x$ adsorber catalyst is connected, preferably directly connected (e.g. without an intervening emissions control device), to an inlet of the SCR catalyst.

A nitrogenous reductant injector may be arranged between the $NO_x$ adsorber catalyst and the selective catalytic reduction (SCR) catalyst. Thus, the $NO_x$ adsorber catalyst may be followed by (e.g. is upstream of) a nitrogenous reductant injector, and the nitrogenous reductant injector may be followed by (e.g. is upstream of) the selective catalytic reduction (SCR) catalyst.

In the second exhaust system embodiment, it may be preferable that the substrate (e.g. of the $NO_x$ adsorber catalyst) is a filtering monolith. It is particularly preferable that the substrate (e.g. of the NO$_x$ adsorber catalyst) is a filtering monolith when the NO$_x$ adsorber catalyst comprises a DOC region.

A third exhaust system embodiment comprises the NO$_x$ adsorber catalyst of the invention (including any one of the first to fifth arrangements of the NO$_x$ adsorber catalyst) and a selective catalytic reduction filter (SCRF™) catalyst. Such an arrangement may be called a PNA/SCRF™. The NO$_x$ adsorber catalyst is typically followed by (e.g. is upstream of) the selective catalytic reduction filter (SCRF™) catalyst. Thus, for example, an outlet of the NO$_x$ adsorber catalyst is connected, preferably directly connected (e.g. without an intervening emissions control device), to an inlet of the selective catalytic reduction filter (SCRF™) catalyst.

A nitrogenous reductant injector may be arranged between the NO$_x$ adsorber catalyst and the selective catalytic reduction filter (SCRF™) catalyst. Thus, the NO$_x$ adsorber catalyst may be followed by (e.g. is upstream of) a nitrogenous reductant injector, and the nitrogenous reductant injector may be followed by (e.g. is upstream of) the selective catalytic reduction filter (SCRF™) catalyst.

A fourth exhaust system embodiment relates to an exhaust system comprising the NO$_x$ adsorber catalyst of the invention (including any one of the first to fifth arrangements of the NO$_x$ adsorber catalyst), a lean NO$_x$ trap (LNT) and either a selective catalytic reduction (SCR) catalyst or selective catalytic reduction filter (SCRF™) catalyst. These arrangements may be called a PNA/LNT/SCR arrangement or a PNA/LNT/SCRF™ arrangement. The NO$_x$ adsorber catalyst is typically followed by (e.g. is upstream of) the lean NO$_x$ trap (LNT). The lean NO$_x$ trap (LNT) is typically followed by (e.g. is upstream of) either the selective catalytic reduction (SCR) catalyst or the selective catalytic reduction filter (SCRF™) catalyst. There may be a hydrocarbon supply apparatus between the NO$_x$ adsorber catalyst and the LNT.

A nitrogenous reductant injector may be arranged between the lean NO$_x$ trap (LNT) and either the selective catalytic reduction (SCR) catalyst or the selective catalytic reduction filter (SCRF™) catalyst. Thus, the lean NO$_x$ trap (LNT) may be followed by (e.g. is upstream of) a nitrogenous reductant injector, and the nitrogenous reductant injector may be followed by (e.g. is upstream of) the selective catalytic reduction (SCR) catalyst or the selective catalytic reduction filter (SCRF™) catalyst.

A fifth exhaust system embodiment relates to an exhaust system comprising the NO$_x$ adsorber catalyst of the invention (including any one of the first to fifth arrangements of the NO$_x$ adsorber catalyst), a catalysed soot filter (CSF) and a selective catalytic reduction (SCR) catalyst. Such an arrangement may be called a PNA/CSF/SCR. The NO$_x$ adsorber catalyst is typically followed by (e.g. is upstream of) the catalysed soot filter (CSF). The catalysed soot filter is typically followed by (e.g. is upstream of) the selective catalytic reduction (SCR) catalyst.

A nitrogenous reductant injector may be arranged between the catalysed soot filter (CSF) and the selective catalytic reduction (SCR) catalyst. Thus, the catalysed soot filter (CSF) may be followed by (e.g. is upstream of) a nitrogenous reductant injector, and the nitrogenous reductant injector may be followed by (e.g. is upstream of) the selective catalytic reduction (SCR) catalyst.

In each of the second to fifth exhaust system embodiments described hereinabove, an ASC catalyst can be disposed downstream from the SCR catalyst or the SCRF™ catalyst (i.e. as a separate substrate monolith), or more preferably a zone on a downstream or trailing end of the substrate monolith comprising the SCR catalyst can be used as a support for the ASC.

The exhaust system of the invention (including the first to the fifth exhaust system embodiments) may further comprise means for introducing hydrocarbon (e.g. fuel) into the exhaust gas. When the means for introducing hydrocarbon into the exhaust gas is a hydrocarbon supply apparatus, it is generally preferred that the hydrocarbon supply apparatus is downstream of the NO$_x$ adsorber catalyst of the invention (unless otherwise specified above).

It may be preferable that the exhaust system of the invention does not comprise a lean NO$_x$ trap (LNT), particularly a lean NO$_x$ trap (LNT) upstream of the NO$_x$ adsorber catalyst, such as directly upstream of the NO$_x$ adsorber catalyst (e.g. without an intervening emissions control device).

The PNA activity of the NO$_x$ adsorber catalyst of the present invention allows NO$_x$, particularly NO, to be stored at low exhaust temperatures. At higher exhaust gas temperatures, the NO$_x$ adsorber catalyst is able to oxidise NO to NO$_2$. It is therefore advantageous to combine the NO$_x$ adsorber catalyst of the invention with certain types of emissions control devices as part of an exhaust system.

Another aspect of the invention relates to a vehicle or an apparatus. The vehicle or apparatus comprises a lean burn engine. Preferably, the lean burn engine is a diesel engine.

The diesel engine may be a homogeneous charge compression ignition (HCCI) engine, a pre-mixed charge compression ignition (PCCI) engine or a low temperature combustion (LTC) engine. It is preferred that the diesel engine is a conventional (i.e. traditional) diesel engine.

It is preferred that the lean burn engine is configured or adapted to run on fuel, preferably diesel fuel, comprises ≤50 ppm of sulfur, more preferably ≤15 ppm of sulfur, such as ≤10 ppm of sulfur, and even more preferably ≤5 ppm of sulfur.

The vehicle may be a light-duty diesel vehicle (LDV), such as defined in US or European legislation. A light-duty diesel vehicle typically has a weight of <2840 kg, more preferably a weight of <2610 kg.

In the US, a light-duty diesel vehicle (LDV) refers to a diesel vehicle having a gross weight of ≤8,500 pounds (US lbs). In Europe, the term light-duty diesel vehicle (LDV) refers to (i) passenger vehicles comprising no more than eight seats in addition to the driver's seat and having a maximum mass not exceeding 5 tonnes, and (ii) vehicles for the carriage of goods having a maximum mass not exceeding 12 tonnes.

Alternatively, the vehicle may be a heavy-duty diesel vehicle (HDV), such as a diesel vehicle having a gross weight of >8,500 pounds (US lbs), as defined in US legislation.

A further aspect of the invention is a method of treating an exhaust gas from an internal combustion engine comprising contacting the exhaust gas with the NOx adsorber catalyst as hereinbefore described, or any of the first to fifth exhaust systems as hereinbefore described. In preferred methods, the exhaust gas is a rich gas mixture. In further preferred methods, the exhaust gas cycles between a rich gas mixture and a lean gas mixture.

In some preferred methods of treating an exhaust gas from an internal combustion engine, the exhaust gas is at a temperature of about 150 to 300° C.

In further preferred methods of treating an exhaust gas from an internal combustion engine, the exhaust gas is contacted with one or more further emissions control devices, in addition to the $NO_x$ adsorber catalyst as hereinbefore described. The emissions control device or devices is preferably downstream of the $NO_x$ adsorber catalyst.

Examples of a further emissions control device include a diesel particulate filter (DPF), a lean $NO_x$ trap (LNT), a lean $NO_x$ catalyst (LNC), a selective catalytic reduction (SCR) catalyst, a diesel oxidation catalyst (DOC), a catalysed soot filter (CSF), a selective catalytic reduction filter (SCRF™) catalyst, an ammonia slip catalyst (ASC), a cold start catalyst (dCSC) and combinations of two or more thereof. Such emissions control devices are all well known in the art.

Some of the aforementioned emissions control devices have filtering substrates. An emissions control device having a filtering substrate may be selected from the group consisting of a diesel particulate filter (DPF), a catalysed soot filter (CSF), and a selective catalytic reduction filter (SCRF™) catalyst.

It is preferred that the method comprises contacting the exhaust gas with an emissions control device selected from the group consisting of a lean $NO_x$ trap (LNT), an ammonia slip catalyst (ASC), diesel particulate filter (DPF), a selective catalytic reduction (SCR) catalyst, a catalysed soot filter (CSF), a selective catalytic reduction filter (SCRF™) catalyst, and combinations of two or more thereof. More preferably, the emissions control device is selected from the group consisting of a diesel particulate filter (DPF), a selective catalytic reduction (SCR) catalyst, a catalysed soot filter (CSF), a selective catalytic reduction filter (SCRF™) catalyst, and combinations of two or more thereof. Even more preferably, the emissions control device is a selective catalytic reduction (SCR) catalyst or a selective catalytic reduction filter (SCRF™) catalyst.

When the method of the invention comprises contacting the exhaust gas with an SCR catalyst or an SCRF™ catalyst, then the method may further comprise the injection of a nitrogenous reductant, such as ammonia, or an ammonia precursor, such as urea or ammonium formate, preferably urea, into exhaust gas downstream of the lean $NO_x$ trap catalyst and upstream of the SCR catalyst or the SCRF™ catalyst.

Such an injection may be carried out by an injector. The injector may be fluidly linked to a source (e.g. a tank) of a nitrogenous reductant precursor. Valve-controlled dosing of the precursor into the exhaust gas may be regulated by suitably programmed engine management means and closed loop or open loop feedback provided by sensors monitoring the composition of the exhaust gas.

Ammonia can also be generated by heating ammonium carbamate (a solid) and the ammonia generated can be injected into the exhaust gas.

Alternatively or in addition to the injector, ammonia can be generated in situ (e.g. during rich regeneration of a LNT disposed upstream of the SCR catalyst or the SCRF™ catalyst). Thus, the method may further comprise enriching of the exhaust gas with hydrocarbons.

The SCR catalyst or the SCRF™ catalyst may comprise a metal selected from the group consisting of at least one of Cu, Hf, La, Au, In, V, lanthanides and Group VIII transition metals (e.g. Fe), wherein the metal is supported on a refractory oxide or molecular sieve. The metal is preferably selected from Ce, Fe, Cu and combinations of any two or more thereof, more preferably the metal is Fe or Cu.

The refractory oxide for the SCR catalyst or the SCRF™ catalyst may be selected from the group consisting of $Al_2O_3$, $TiO_2$, $CeO_2$, $SiO_2$, $ZrO_2$ and mixed oxides containing two or more thereof. The non-zeolite catalyst can also include tungsten oxide (e.g. $V_2O_5/WO_3/TiO_2$, $WO_x/CeZrO_2$, $WO_x/ZrO_2$ or $Fe/WO_x/ZrO_2$). Additionally or alternatively, the non-zeolite catalyst can also include Nb, Ce and oxides thereof, e.g. $NbO_x/CeO_2$ or $WO_x/CeO_2$.

It is particularly preferred when an SCR catalyst, an SCRF™ catalyst or a washcoat thereof comprises at least one molecular sieve, such as an aluminosilicate zeolite or a SAPO. The at least one molecular sieve can be a small, a medium or a large pore molecular sieve. By "small pore molecular sieve" herein we mean molecular sieves containing a maximum ring size of 8, such as CHA; by "medium pore molecular sieve" herein we mean a molecular sieve containing a maximum ring size of 10, such as ZSM-5; and by "large pore molecular sieve" herein we mean a molecular sieve having a maximum ring size of 12, such as beta. Small pore molecular sieves are potentially advantageous for use in SCR catalysts.

In the method of treating an exhaust gas of the invention, preferred molecular sieves for an SCR catalyst or an SCRF™ catalyst are synthetic aluminosilicate zeolite molecular sieves selected from the group consisting of AEI, AFX, ZSM-5, ZSM-20, ERI including ZSM-34, mordenite, ferrierite, BEA including Beta, Y, CHA, LEV including Nu-3, MCM-22 and EU-1, preferably AEI or CHA, and having a silica-to-alumina ratio of about 10 to about 50, such as about 15 to about 40.

EXAMPLES

The invention will now be illustrated by the following non-limiting examples.

Materials

All materials are commercially available and were obtained from known suppliers, unless noted otherwise. STI zeolites were prepared by the methods indicated below.

Example 1: Preparation of Passive NOx Adsorbers (PNAs) of the Invention

Preparation of STI Zeolite

Unless stated otherwise, STI zeolites were prepared by the method described in US 2008/058196 A1, which is incorporated by reference herein in its entirety.

PNA 1A: 1% Pd/STI SAR41

Palladium is added to STI zeolite with a silica-to-alumina ratio (SAR) of 41 according to the following procedure to produce PNA 1A: The powder catalyst is prepared by wet impregnation of the zeolite using a soluble palladium compound as the precursor. After drying at 105° C., the sample is calcined at 500° C. to provide the fresh catalyst, and a portion of the fresh catalyst is then hydrothermally aged at 750° C. in an air atmosphere containing 10% $H_2O$ by volume. The Pd loading of PNA 1A is 1 wt. %.

PNA 1B: 1% Pd/STI SAR30

PNA 1B is produced using the same procedure as PNA 1A with the exception that the STI zeolite used had a silica-to-alumina ratio (SAR) of 30. The Pd loading of PNA 1B is 1 wt. %.

PNA 1C: 1% Pd/STI SAR30 Aged at 800° C.

PNA 1C is produced using the same procedure as PNA 1A with the exception that the Pd/STI was aged at 800° C. rather than 750° C. The Pd loading of PNA 1C is 1 wt. %.

PNA 1 D: 1% Pd/STI SAR16

PNA 1D is produced using the same procedure as PNA 1A with the exception that the STI zeolite used had a silica-to-alumina ratio (SAR) of 16 and was synthesized according to the method disclosed in S. B. Hong et al J. Am. Chem. Soc.

2004, 126, 5817, which is incorporated by reference herein in its entirety. The Pd loading of PNA 1D is 1 wt. %.

Example 2: Preparation of Comparative PNA

Comparative PNA 2A: 1 wt. % Pd/CHA

Comparative PNA 2A is produced using the same procedure as PNA 1A with the exception that a small pore chabazite (CHA) zeolite with a silica-to-alumina ratio (SAR) of 25 is used instead of STI. The Pd loading of Comparative PNA 2A is 1 wt. %.

Example 3: NOx Storage Capacity Test Procedure

The catalyst (0.4 g) is held at the adsorption temperature of about 100° C. for 5 minutes in an NO-containing gas mixture flowing at 2 litres per minute at a MHSV of 300 L*hr$^{-1}$*g$^{-1}$. This adsorption stage is followed by Temperature Programmed Desorption (TPD) at a ramping rate of 17° C./minute in the presence of the same NO-containing gas until the bed temperature reaches about 450° C.

The NO-containing gas mixture during both the adsorption and desorption comprises 10 vol. % $O_2$, 60 ppm NO, 5 vol. % $CO_2$, 1500 ppm CO, 130 ppm $C_3H_6$, and 5 vol. % $H_2O$ in $N_2$.

The $NO_x$ storage is calculated as the amount of NO stored in milligrams per gram of powder catalyst (until the outlet NOx concentration reaches the original inlet value). The results are shown in Table 1 along with the peak NOx release temperatures.

TABLE 1

| Sample | NOx storage (mgNO/g) | | NOx release temperature (° C.) | |
|---|---|---|---|---|
| | Fresh | Aged | Fresh | Aged |
| PNA 1A | 1.16 | 1.15 | 315 | 310 |
| PNA 1B | 1.53 | 1.69 | 330 | 310 |
| PNA 1C | 1.53 | 1.39 | — | 315 |
| PNA1D | 2.70 | 1.82 | 333 | 310 |
| PNA 2A | 1.82 | 2.24 | 260 | 250 |

It can be seen from the results in Table 1 that each of PNAs 1A, 1B, and 1C, which contain a molecular sieve catalyst comprising palladium and a molecular sieve having an STI Framework Type (i.e. catalysts according to the invention), have an increased NOx release temperature (310 or 315° C.) compared to PNA 2A (250° C.), which comprises a Pd/chabazite molecular sieve catalyst. This can be particularly advantageous when used in combination with a downstream SCR catalyst, to ensure that NOx is not released from an upstream PNA before the SCR catalyst is at a sufficiently high temperature to catalyse the reduction of the released $NO_x$.

The invention claimed is:

1. A $NO_x$ adsorber catalyst for treating an exhaust gas from a diesel engine comprising:
    a first region comprising a $NO_x$ adsorber material comprising a first molecular sieve catalyst, wherein the first molecular sieve catalyst comprises a first noble metal and a first molecular sieve, and wherein the first molecular sieve contains the noble metal; wherein the first molecular sieve has an STI Framework Type; and,
    a second molecular sieve catalyst, wherein the second molecular sieve catalyst comprises a second noble metal and a second molecular sieve and wherein the second noble metal comprises palladium.

2. The $NO_x$ adsorber catalyst according to claim 1, wherein the first noble metal comprises palladium.

3. The $NO_x$ adsorber catalyst according to claim 1, wherein the first molecular sieve has an aluminosilicate framework, an aluminophosphate framework, a silicoaluminophosphate framework, a metal-substituted aluminosilicate framework, a metal-substituted aluminophosphate framework, or a metal-substituted silicoaluminophosphate framework.

4. The $NO_x$ adsorber catalyst according to claim 1, wherein the first molecular sieve has an aluminosilicate framework and a silica to alumina molar ratio of 1 to 200.

5. The $NO_x$ adsorber catalyst according to claim 1, wherein the second molecular sieve has an aluminosilicate framework, an aluminophosphate framework, a silicoaluminophosphate framework, a metal-substituted aluminosilicate framework, a metal-substituted aluminophosphate framework, or a metal-substituted silicoaluminophosphate framework.

6. The $NO_x$ adsorber catalyst according to claim 1, wherein the second molecular sieve is a small, medium or large pore molecular sieve selected from the group of Framework Type consisting of ACO, AEI, AEN, AFN, AFT, AFX, ANA, APC, APD, ATT, CDO, CHA, CON, CSV, DDR, DFT, EAB, EDI, EPI, ERI, EUO, GIS, GME, GOO, IFR, IHW, ITE, ITW, LEV, KFI, LTL, MAZ, MER, MFS, MON, MOR, MTW, MWW, NES, NSI, OFF, OWE, PAU, PHI, RHO, RTH, SAT, SAV, SEW, SFS, SFW, SIV, STF, SVR, SZR, THO, TSC, UEI, UFI, VNI, YUG, ZON, BEA, and MFI, and intergrowths of two or more.

7. A $NO_x$ adsorber catalyst for treating an exhaust gas from a diesel engine comprising:
    a first region comprising a $NO_x$ adsorber material comprising a first molecular sieve catalyst, wherein the first molecular sieve catalyst comprises a first noble metal and a first molecular sieve, and wherein the first molecular sieve contains the noble metal; wherein the first molecular sieve has an STI Framework Type; and
    a second molecular sieve catalyst, wherein the second molecular sieve catalyst comprises a second noble metal and a second molecular sieve and wherein the second molecular sieve is a small pore molecular sieve is selected from the group Framework Type consisting of AEI and CHA.

8. The $NO_x$ adsorber catalyst according to claim 7, wherein the second molecular sieve has an aluminosilicate framework and a silica to alumina molar ratio of 5 to 200.

9. The $NO_x$ adsorber catalyst according to claim 1, further comprising a second region.

10. The $NO_x$ adsorber catalyst according to claim 9, wherein the second region comprises the second molecular sieve catalyst.

11. The NOx adsorber catalyst according to claim 9, wherein the second region comprises a nitrogen dioxide reduction material comprising an inorganic oxide.

12. The $NO_x$ adsorber catalyst according to claim 9, further comprising a substrate having an inlet end and an outlet end.

13. The $NO_x$ adsorber catalyst according to claim 12, wherein the substrate is a flow-through monolith or a filtering monolith.

14. The NOx adsorber catalyst according to claim 1, wherein the first molecular sieve catalyst is extruded to form a flow-through or filter substrate.

15. An exhaust system comprising the $NO_x$ adsorber catalyst of claim 1 and an emissions control device.

16. An exhaust system according to claim 15, wherein the emissions control device is selected from the group consisting of emissions control device selected from the group consisting of a diesel particulate filter (DPF), a lean $NO_x$ trap (LNT), a lean $NO_x$ catalyst (LNC), a passive NOx adsorber (PNA), a cold start catalyst (dCSC), a selective catalytic reduction (SCR) catalyst, a diesel oxidation catalyst (DOC), a catalysed soot filter (CSF), a selective catalytic reduction filter (SCRF) catalyst, an ammonia slip catalyst (ASC) and combinations of two or more thereof.

17. A vehicle comprising a lean burn engine and the $NO_x$ adsorber catalyst of claim 1.

18. A vehicle according to claim 17, wherein the lean burn engine is configured to run on diesel fuel comprising ≤50 ppm of sulfur.

19. A method of treating an exhaust gas from a lean burn engine comprising contacting the exhaust gas with a NOx adsorber catalyst according to claim 1.

\* \* \* \* \*